(12) United States Patent
Lopez et al.

(10) Patent No.: US 11,719,167 B2
(45) Date of Patent: Aug. 8, 2023

(54) OPERATING A TURBOPROP ENGINE FOR IN-FLIGHT RESTART

(71) Applicant: PRATT & WHITNEY CANADA CORP., Longueuil (CA)

(72) Inventors: Simon Lopez, Montreal (CA); Jeremie Hebert, Napierville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 93 days.

(21) Appl. No.: 17/220,008

(22) Filed: Apr. 1, 2021

(65) Prior Publication Data
US 2022/0316407 A1  Oct. 6, 2022

(51) Int. Cl.
*F02C 9/16* (2006.01)
*B64C 11/30* (2006.01)
*F02C 6/20* (2006.01)

(52) U.S. Cl.
CPC ............... *F02C 9/16* (2013.01); *B64C 11/30* (2013.01); *F02C 6/206* (2013.01); *F05D 2270/021* (2013.01)

(58) Field of Classification Search
CPC ...... F05D 2270/021; F02C 7/042; F02C 9/16; F02C 7/26; F02C 7/262; F02C 9/22; F02C 9/20
See application file for complete search history.

(56) References Cited

U.S. PATENT DOCUMENTS

| | | | |
|---|---|---|---|
| 6,077,040 A | 6/2000 | Pruden et al. | |
| 8,159,081 B2* | 4/2012 | Gainford | F01D 21/02 290/40 C |
| 10,040,565 B2 | 8/2018 | Looper et al. | |
| 10,823,113 B2* | 11/2020 | Lamarre | F02C 9/44 |
| 10,981,662 B2* | 4/2021 | Ettorre | B64C 11/34 |
| 2020/0010219 A1* | 1/2020 | Felippone | F02C 9/58 |
| 2020/0088108 A1* | 3/2020 | Klein | F02K 3/06 |
| 2020/0189721 A1 | 6/2020 | Maver et al. | |
| 2021/0009278 A1* | 1/2021 | Forte | B64D 31/06 |
| 2021/0079855 A1 | 3/2021 | Cervelli et al. | |

FOREIGN PATENT DOCUMENTS

| | | |
|---|---|---|
| EP | 2987984 | 2/2016 |
| EP | 3543504 | 9/2019 |

* cited by examiner

*Primary Examiner* — Todd E Manahan
*Assistant Examiner* — Thuyhang N Nguyen
(74) *Attorney, Agent, or Firm* — Norton Rose Fulbright Canada LLP

(57) ABSTRACT

There are described methods and systems for operating an aircraft turboprop engine. The method comprises controlling a propeller of the turboprop engine based on a selected one of a reference propeller rotational speed and a minimum propeller blade angle while the turboprop engine is running; detecting an inflight restart of the turboprop engine; and controlling the propeller during the inflight restart in accordance with at least one of a modified reference propeller rotational speed and a modified minimum propeller blade angle to maintain an actual propeller blade angle above an aerodynamic disking angle during the inflight restart.

20 Claims, 8 Drawing Sheets

OPERATING A TURBOPROP ENGINE FOR IN-FLIGHT RESTART

TECHNICAL FIELD

The application relates generally to turboprop engines and, more particularly, to preventing overspeed events during in-flight restart of turboprop engines.

BACKGROUND OF THE ART

Overspeed is a condition in which an engine is allowed or forced to turn beyond its design limit. In a propeller-based aircraft, various scenarios may cause an overspeed. For this reason, overspeed protection systems are provided to avoid the damage that may be caused to the engine by the overspeed event. However, under certain specific circumstances, it may be preferable to avoid triggering the overspeed protection.

SUMMARY

In one aspect, there is provided a method for operating an aircraft turboprop engine. The method comprises controlling a propeller of the turboprop engine based on a selected one of a reference propeller rotational speed and a minimum propeller blade angle while the turboprop engine is running; detecting an inflight restart of the turboprop engine; and controlling the propeller during the inflight restart in accordance with at least one of a modified reference propeller rotational speed and a modified minimum propeller blade angle to maintain an actual propeller blade angle above an aerodynamic disking angle during the inflight restart.

In another aspect, there is provided a system for operating an aircraft turboprop engine. The system comprises a processor and a non-transitory computer-readable medium having stored thereon program instructions. The program instructions are executable by the processor for controlling a propeller of the turboprop engine based on a selected one of a reference propeller rotational speed and a minimum propeller blade angle while the turboprop engine is running; detecting an inflight restart of the turboprop engine; and controlling the propeller during the inflight restart in accordance with at least one of a modified reference propeller rotational speed and a modified minimum propeller blade angle to maintain an actual propeller blade angle above an aerodynamic disking angle during the inflight restart.

In yet another aspect, there is provided a method for operating an aircraft turboprop engine. The method comprises controlling a propeller of the turboprop engine based on a selected one of a reference propeller rotational speed and a minimum propeller blade angle while the turboprop engine is running; when an inflight restart of the turboprop engine is detected, at least one of increasing the minimum propeller blade angle and lowering the reference propeller rotational speed used to control the propeller; and controlling the propeller during the inflight restart with at least one of the minimum propeller blade angle as increased and the reference propeller rotational speed as decreased.

The embodiments and features described herein may be used in any combination.

DESCRIPTION OF THE DRAWINGS

Reference is now made to the accompanying figures in which.

DETAILED DESCRIPTION

Figure 1:
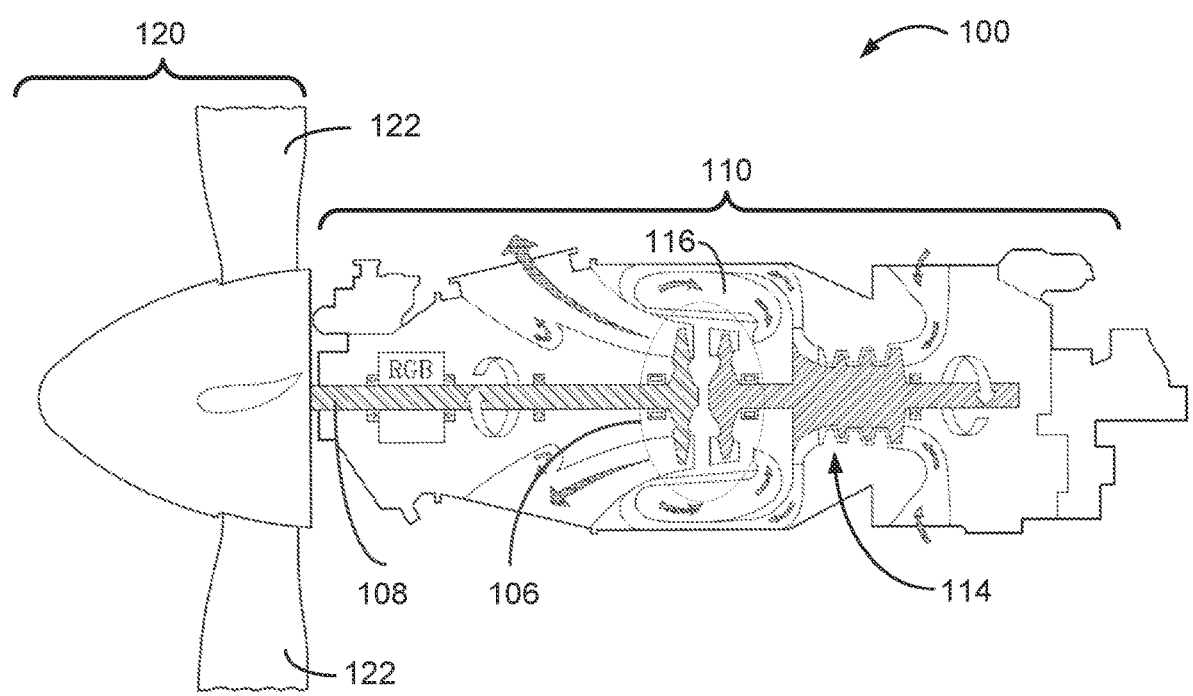
FIG. 1 is a schematic of an example gas turbine engine and propeller.

FIG. 1 illustrates a powerplant 100 for an aircraft of a type typically provided for use in subsonic flight, comprising an engine 110 and a propeller 120. The powerplant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force for the aircraft, also known as thrust. The propeller 120 comprises two or more propeller blades 122 that are adjustable in angle position. The blade angle may be referred to as a beta angle, an angle of attack or a blade pitch. The engine 110 may be a single or multi-spool gas turbine engine, where the turbine section 106 is connected to the propeller 120 through a reduction gearbox (RGB).

Figure 2:
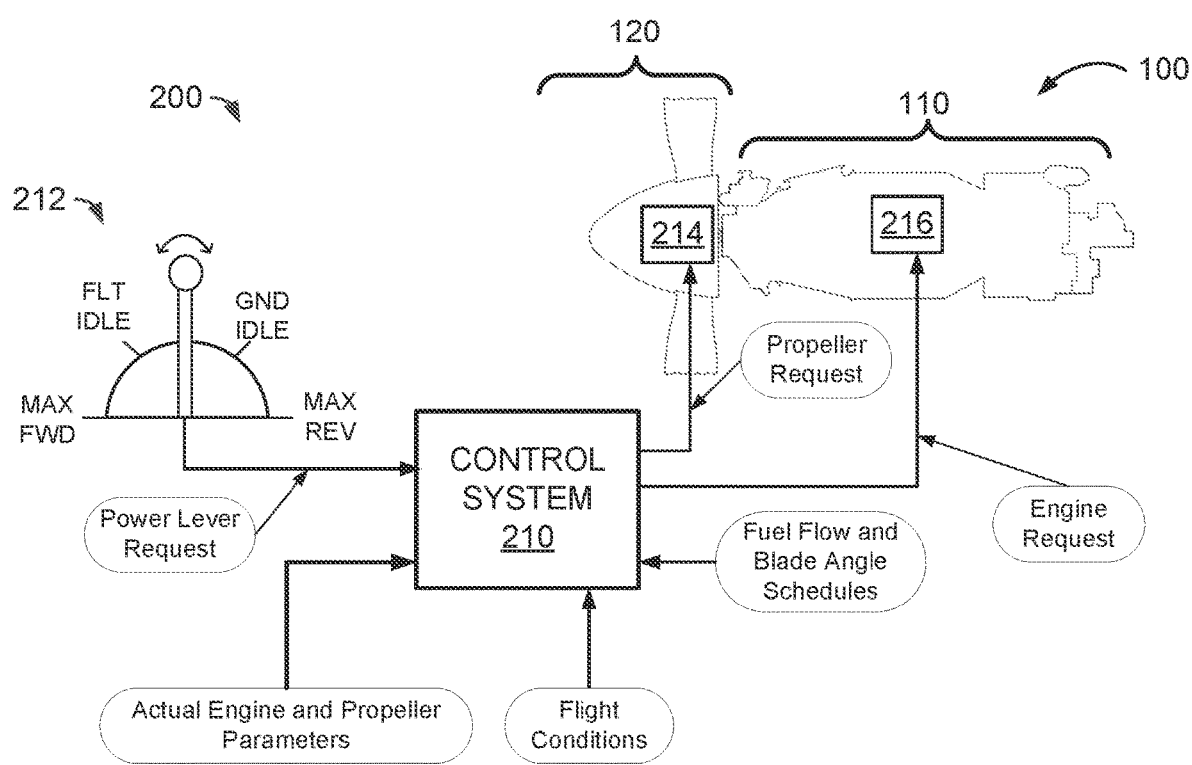
FIG. 2 is a schematic diagram illustrating an example system for controlling operation of the engine and propeller of FIG. 1.

With reference to FIG. 2, there is illustrated an example of a system 200 for operating the powerplant 100. In the illustrated embodiment, a control system 210 receives a power lever request from a power lever 212 of the aircraft, controlled by a pilot or other aircraft operator. The power lever request is indicative of a position of the power lever 212 and represents a thrust demand. Several power lever positions can be selected, including those for (1) maximum forward thrust (MAX FWD), which is typically used during takeoff; (2) flight idle (FLT IDLE), which may be used in flight during approach or during taxiing on the ground; (3) ground idle (GND IDLE), at which the propeller 120 is spinning, but providing very low thrust; (4) maximum reverse thrust (MAX REV), which is typically used at landing in order to slow the aircraft. Intermediate positions between the abovementioned positions can also be selected.

The control system 210 is configured to control the engine 110 and the propeller 120 based on the power lever request. An engine request is output to an engine actuator 216 for adjusting engine fuel flow, and a propeller request is output to a propeller actuator 214 for adjusting the blade angle of the propeller 120. The engine actuator 216 and/or propeller actuator 214 may each be implemented as a torque motor, a stepper motor or any other suitable actuator. The propeller actuator 214 controls hydraulic oil pressure to adjust the blade angle based on the propeller request. The engine actuator 216 adjusts the fuel flow to the engine 110 based on the engine request. The engine request and/or propeller request are determined as a function of the power lever request and one or more inputs that take into account various engine and/or operating conditions. For example, actual engine and propeller parameters such as propeller rotational speed (NP), propeller blade angle (β), and gas generator speed (NG) are used to determine how the fuel flow and blade angle are to be adjusted in order to provide the power lever request. Flight conditions such as aircraft speed (CAS), altitude (ALT), outside ambient temperature (OAT), and the like may be taken into account as well in setting the engine request and/or propeller request, in combination with a corresponding schedule for fuel flow and/or blade angle.

While the control system 210 is illustrated as separate from the powerplant 100, this is for illustrative purposes. In addition, control of the propeller 120 and engine 110 may be effected by separate controllers, such as an electronic engine controller (EEC) and a propeller control unit (PCU) (which may be electronic or hydraulic), or by a single controller that combines the functionalities of the EEC and the PCU.

Figure 3:
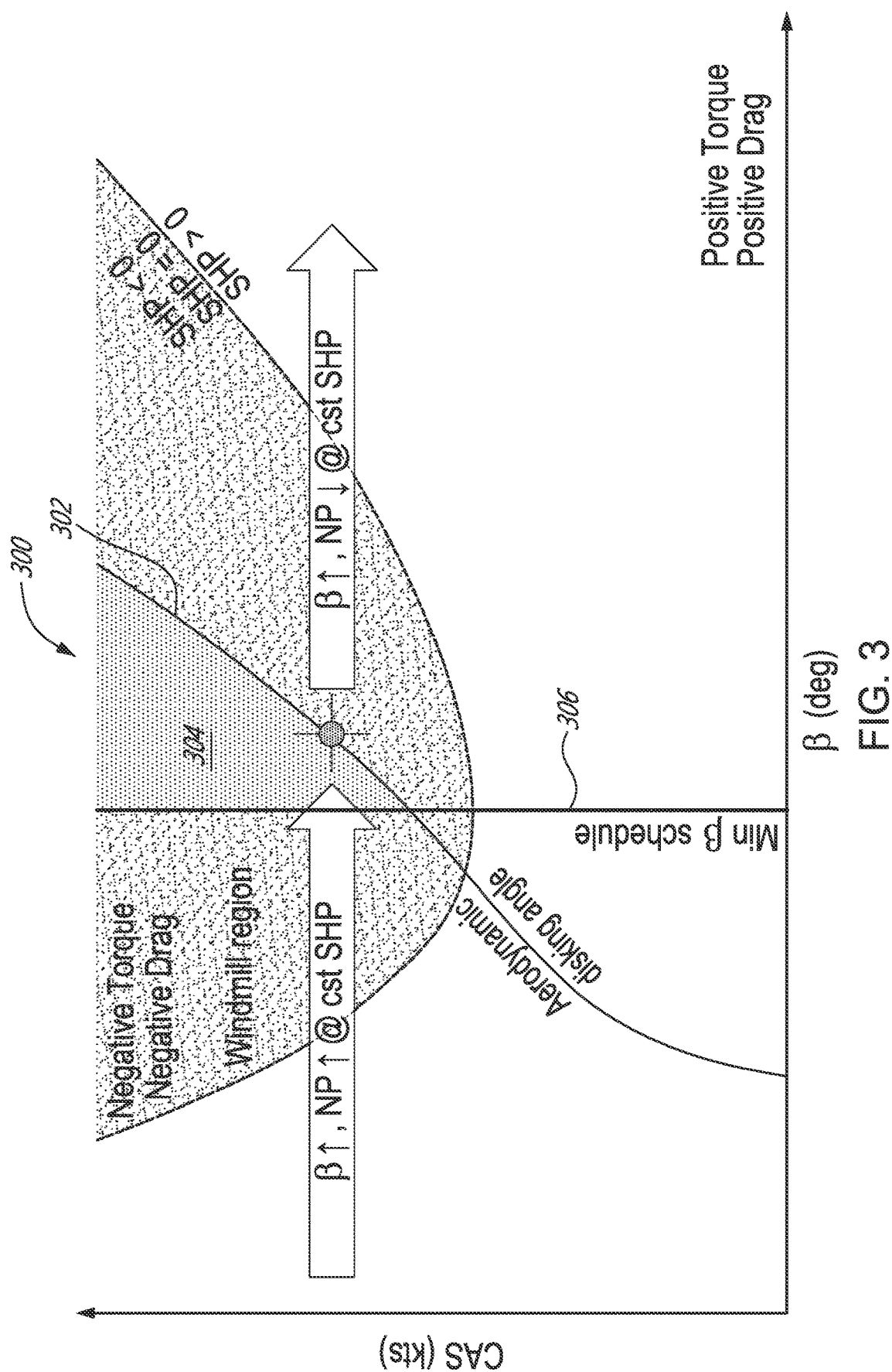
FIG. 3 is a graph illustrating a relationship between aircraft speed and aerodynamic disking angle.

In normal operation, the propeller 120 is controlled using one of two control laws: (1) based on a reference (or target) NP; or (2) based on a minimum β. Under particular flight conditions (i.e. OAT, ALT, CAS), the minimum β, which is typically set as a design parameter, may cause a propeller overspeed event that can trigger the feather solenoid overspeed protection system. As a result, sudden thrust variations can be felt by the pilot and the passengers, which can be undesirable. With reference to FIG. 3, graph 300 illustrates the relationship between aircraft speed (CAS) and an aerodynamic disking angle of the propeller for constant ALT, OAT, and NP. The aerodynamic disking angle is the angle at which the rotational drag of the propeller is at its minimum value for a given set of flight conditions. As shown in graph 300, the aerodynamic disking angle 302 varies with CAS. When the blade angle of the propeller is greater than the aerodynamic disking angle, an increase in β results in a decrease of NP at a constant shaft horse power (SHP). When the blade angle of the propeller is smaller than the aerodynamic disking angle, an increase in in β results in an increase of NP at a constant shaft horse power (SHP).

Region 304 is bounded by the aerodynamic disking angle 302 and by a minimum β schedule 306 and represents an operating regime where the minimum β is lower than the aerodynamic disking angle and the propeller is windmilling. At the initiation of an engine inflight procedure, the actual NP is below the reference NP. The β is reduced to increase NP towards the reference NP. However, for a given range of CAS, if the value of β is reduced below the aerodynamic disking angle 302, the behavior of the propeller changes such that increasing causes an increase in NP. Therefore, when the reference NP is reached and β is increased to maintain the reference NP, an overspeed occurs.

In order to avoid the overspeed event during an inflight restart, the propeller is controlled so as to ensure that β does not fall below the aerodynamic disking angle. A first approach is to use a modified minimum β for inflight restarts, by temporarily setting the minimum β to a value that is greater than or equal to the aerodynamic disking angle. This directly prevents β from being reduced below the aerodynamic disking angle. A second approach is to use a modified reference NP during inflight restarts, by temporarily setting the reference NP to a lower value. This indirectly prevents β from being reduced below the aerodynamic disking angle as the reference NP is reached before reaching the minimum β value. A third approach is to use a combination of a modified minimum β and a modified reference NP by temporarily setting the minimum β to an increased value and temporarily setting the reference NP to a lower value, such that the combination of an increased minimum β and a decreased reference NP will ensure that the actual β remains above the aerodynamic disking angle during the inflight restart.

Figure 4:
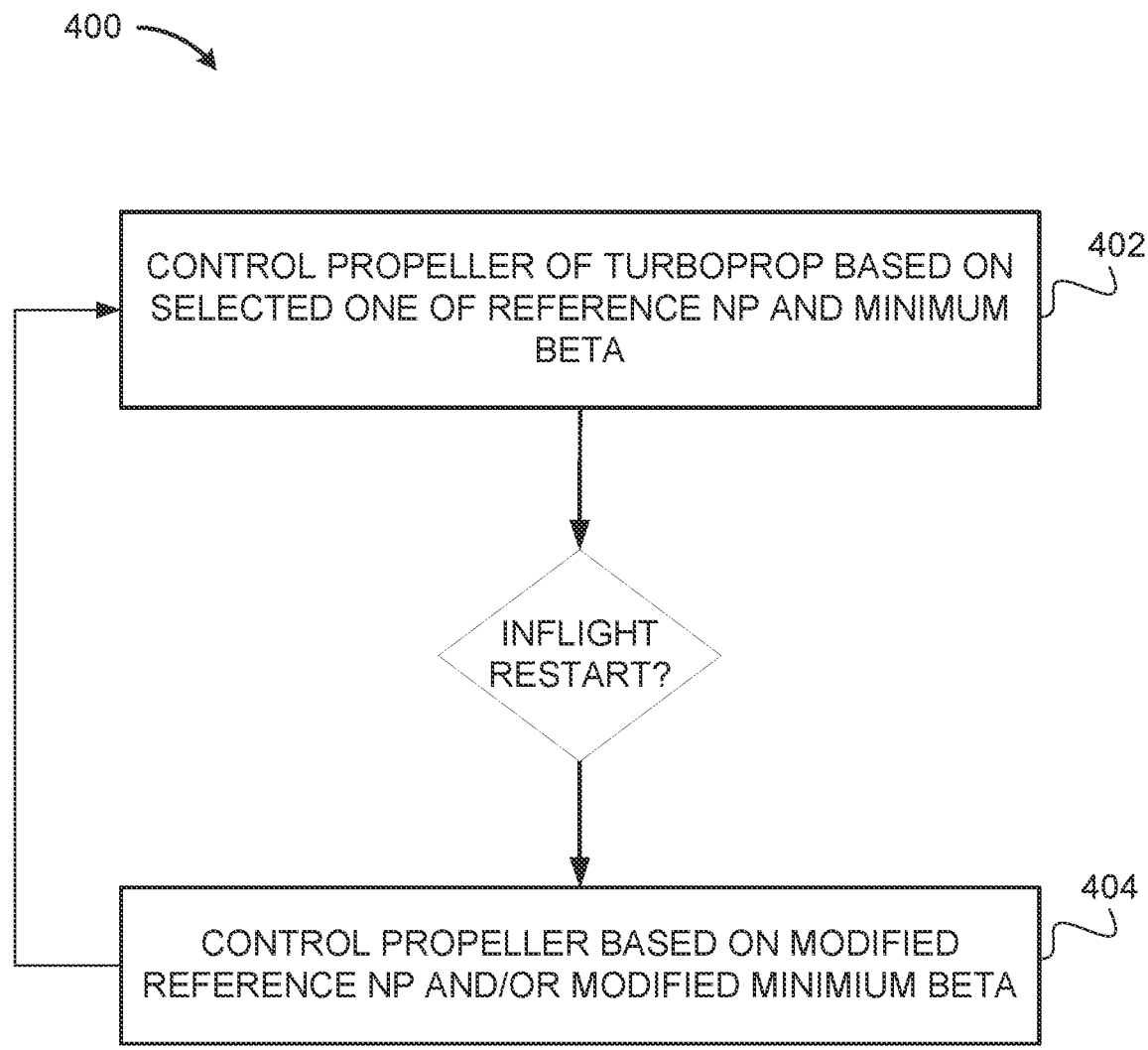
FIG. 4 is a flowchart of an example method for operating an aircraft turboprop engine.

FIG. 4 illustrates an example method 400 for operating an aircraft turboprop engine to prevent an overspeed event during an inflight restart. At step 402, the propeller of the turboprop engine is controlled based on a selected one of a reference NP and a minimum β. When an inflight restart is detected, the propeller is controlled during the inflight restart in accordance with a modified reference NP and/or a modified minimum β to maintain an actual β above the aerodynamic disking angle during the inflight restart.

The modified reference propeller rotational speed and/or modified minimum propeller blade angle are referred to collectively as a modified schedule. It will be understood that the expression "modified schedule" includes embodiments where the reference NP and/or minimum β is modified by providing a separate and dedicated modified schedule, as well as embodiments where the reference NP and/or minimum β is modified through the application of a gain or a bias to normal schedule values. In both cases, the result is that the actual propeller blade angle is maintained above the aerodynamic disking angle during the inflight restart.

Figure 5A:
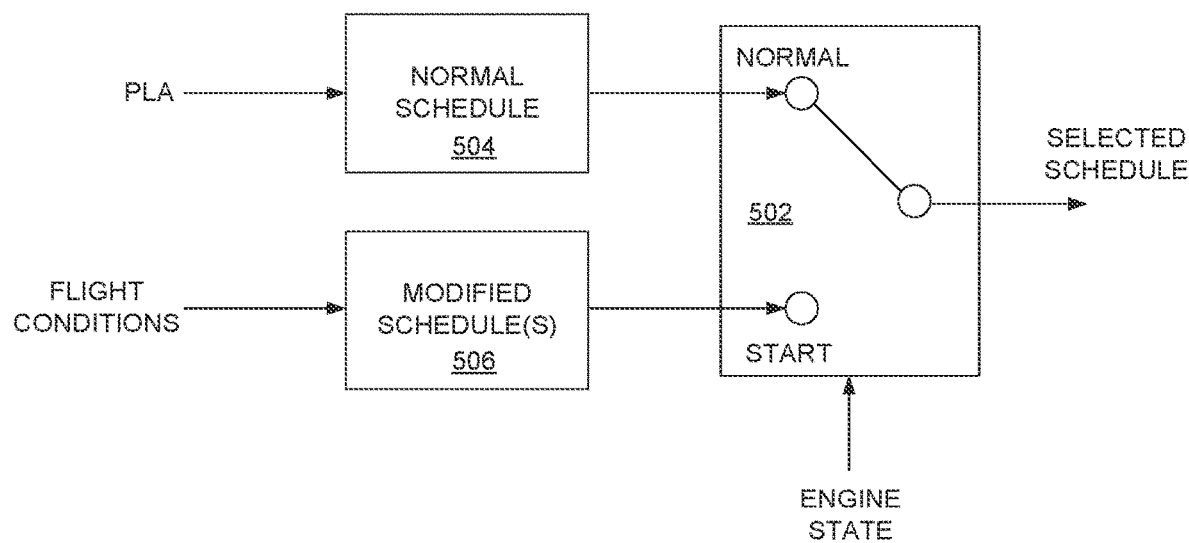
FIGS. 5A-5C are example implementations for detecting an inflight restart.

In some embodiments, no distinction is made between an inflight restart and a ground start, and the modified schedule is applied whenever an engine start is detected. An example is illustrated in FIG. 5A, where a switch 502 is used to select either a normal schedule 504 or a modified schedule 506 based on the engine state, which is either a normal state or a start state. The modified schedule may be selected among a plurality of modified schedules based on flight conditions.

Figure 5B:
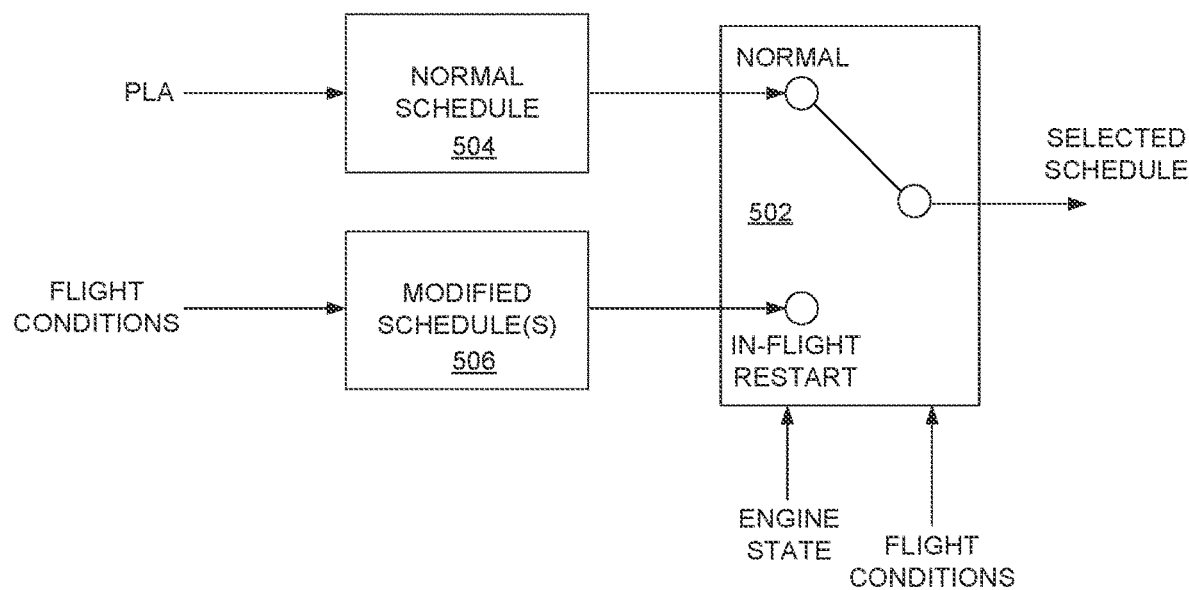
Figure 5C:
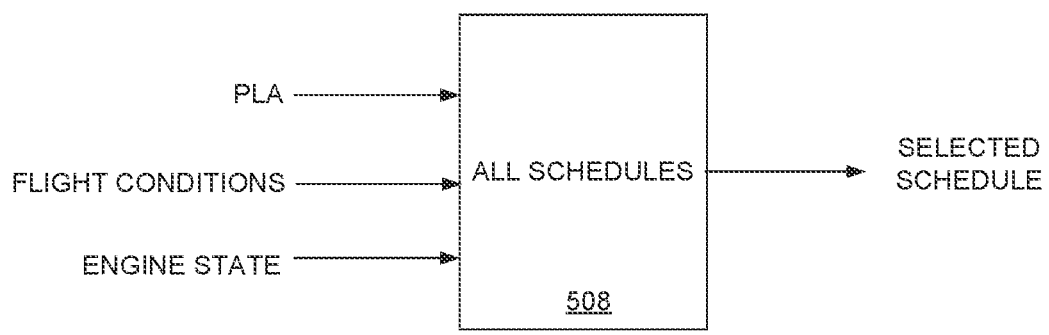

In some embodiments, an inflight restart is detected using a combination of engine state and flight conditions. For example, if the engine state is an engine start and the altitude and/or aircraft speed is greater than a threshold, then an inflight restart is detected and the selected schedule corresponds to a modified schedule. In a first example implementation illustrated in FIG. 5B, the switch 502 is designed to make the distinction between the in-flight restart and the normal operation. In an alternative implementation illustrated in FIG. 5C, the distinction is not made via a switch but is instead applied more generally to the selection of a most suitable schedule given the PLA, the flight conditions, and the engine state, whereby at least one of the schedules is the modified schedule having the reference NP and/or minimum β values that will maintain the actual propeller blade angle above the aerodynamic disking angle during the inflight restart.

Additional parameters may be used to further limit the application of the modified schedule to certain specific circumstances. For example, and as illustrated in FIG. 3, the operating region 304 to be avoided is only present above certain aircraft speeds and for negative SHP values. Therefore, in some embodiments, detecting the inflight restart may comprise determining that the aircraft is operating within a given range of aircraft speeds and/or that SHP<0.

Figure 6:
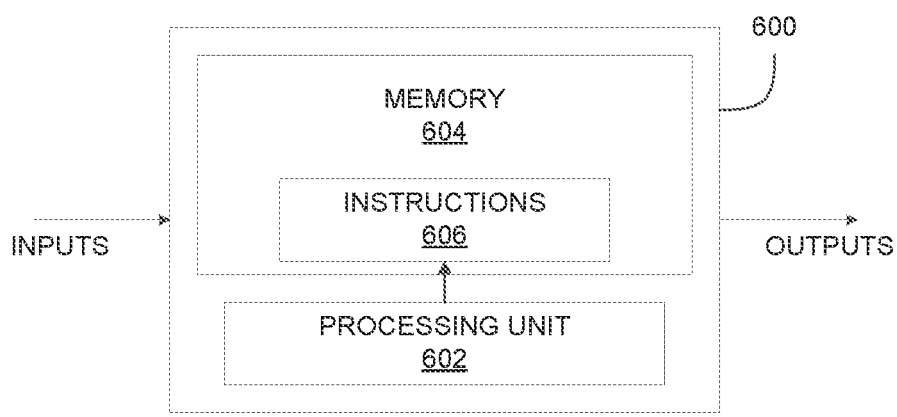
FIG. 6 is a block diagram of an example computing device.

The method 400 may be implemented in the control system 210 with one or more computing device 600, an example of which is illustrated in FIG. 6. For simplicity only one computing device 600 is shown but the system 210 may include more computing devices 600 operable to exchange data. The computing devices 600 may be the same or different types of devices. Note that the control system 210 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 600 comprises a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps performed as part of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 606 executable by processing unit 602.

The methods and systems for operating an aircraft turboprop engine described herein may be implemented in a high level procedural or object oriented programming or scripting language, or a combination thereof, to communicate with or assist in the operation of a computer system, for example the computing device 600. Alternatively, the methods and systems for operating an aircraft turboprop engine may be implemented in assembly or machine language. The language may be a compiled or interpreted language. Program code for implementing the methods and systems for operating an aircraft turboprop engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an aircraft turboprop engine may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, application of the modified schedule may be disabled under certain circumstances where it is deemed unsafe or unnecessary. Alternatively or in combination therewith, application of the modified schedule may be performed only when the design values for the reference NP and the minimum $\beta$ are within a given range of values. Yet further modifications could be implemented by a person of ordinary skill in the art in view of the present disclosure, which modifications would be within the scope of the present technology.

The invention claimed is:
1. A method for operating an aircraft turboprop engine, the method comprising:
controlling a propeller of the turboprop engine based on a reference propeller rotational speed and a minimum propeller blade angle while the turboprop engine is running;

detecting an inflight restart of the turboprop engine, the detecting of the inflight restart comprising detecting an engine start, and in response to detecting the engine start, detecting the inflight restart using flight conditions; and controlling the propeller during the inflight restart in accordance with a modified reference propeller rotational speed and a modified minimum propeller blade angle to maintain an actual propeller blade angle above an aerodynamic disking angle and a decreased reference propeller rotational speed during the inflight restart.

2. The method of claim 1, wherein the detecting of the inflight restart comprises detecting an engine start and treating the engine start as the inflight restart.

3. The method of claim 1, wherein the detecting of the inflight restart comprises distinguishing between a normal engine operating state and an inflight restart engine state using the flight conditions, an engine state, and a power lever request.

4. The method of claim 1, wherein the modified minimum propeller blade angle is a dedicated blade angle schedule for inflight restarts.

5. The method of claim 1, wherein the modified reference propeller rotational speed is a dedicated propeller rotational speed schedule for inflight restarts.

6. The method of claim 1, wherein the modified minimum propeller blade angle is the minimum propeller blade angle with an applied bias or an applied gain.

7. The method of claim 1, wherein the modified reference propeller rotational speed is the reference propeller rotational speed with an applied bias or an applied gain.

8. The method of claim 1, wherein the detecting of the inflight restart comprises detecting an engine start state and detecting that the aircraft is operating within a range of aircraft speeds.

9. A system for operating an aircraft turboprop engine, the system comprising:
a processor; and
a non-transitory computer-readable medium having stored thereon program instructions executable by the processor for:
controlling a propeller of the turboprop engine based on a reference propeller rotational speed and a minimum propeller blade angle;
detecting an inflight restart of the turboprop engine, the detecting of the inflight restart comprising detecting an engine start, and in response to detecting the engine start, detecting the inflight restart using flight conditions; and
controlling the propeller during the inflight restart in accordance with a modified reference propeller rotational speed and a modified minimum propeller blade angle to maintain an actual propeller blade angle above an aerodynamic disking angle and a decreased reference propeller rotational speed during the inflight restart.

10. The system of claim 9, wherein the detecting of the inflight restart comprises detecting an engine start and treating the engine start as the inflight restart.

11. The system of claim 9, wherein the detecting of the inflight restart comprises distinguishing between a normal engine operating state and an inflight restart engine state using the flight conditions, an engine state, and a power lever request.

12. The system of claim 9, wherein the modified minimum propeller blade angle is a dedicated blade angle schedule for inflight restarts.

13. The system of claim 9, wherein the modified reference propeller rotational speed is a dedicated propeller rotational speed schedule for inflight restarts.

14. The system of claim 9, wherein the modified minimum propeller blade angle is the minimum propeller blade angle with an applied bias or an applied gain.

15. The system of claim 9, wherein the modified reference propeller rotational speed is the reference propeller rotational speed with an applied bias or an applied gain.

16. The system of claim 9, wherein the detecting of the inflight restart comprises detecting an engine start state and detecting that the aircraft is operating within a range of aircraft speeds.

17. The system of claim 9, wherein the detecting of the inflight restart comprises detecting an engine start state and detecting that the aircraft is operating at an altitude greater than a threshold.

18. A method for operating an aircraft turboprop engine, the method comprising:
controlling a propeller of the turboprop engine based on a reference propeller rotational speed and a minimum propeller blade angle while the turboprop engine is running;
when an inflight restart of the turboprop engine is detected, the detecting of the inflight restart comprising detecting an engine start, and in response to detecting the engine start, detecting the inflight restart using flight conditions, increasing the minimum propeller blade angle above an aerodynamic disking angle and lowering the reference propeller rotational speed used to control the propeller; and
controlling the propeller during the inflight restart with the minimum propeller blade angle as increased and the reference propeller rotational speed as decreased.

19. The method of claim 18, wherein the increasing of the minimum propeller blade angle comprises increasing the minimum propeller blade angle to a value greater than or equal to an aerodynamic disking angle of the propeller.

20. The method of claim 1, wherein the detecting of the inflight restart comprises detecting an engine start state and detecting that the aircraft is operating at an altitude greater than a threshold.

* * * * *